United States Patent [19]
Augustin

[11] 3,773,636
[45] Nov. 20, 1973

[54] METHOD FOR THE CONTROL OF THE PASSAGE OF THE WORKING MEDIUM FOR ELECTRIC WORKING PROCESSES AND ARRANGEMENT FOR EXECUTING THIS METHOD

[75] Inventor: Jan Augustin, Podolie, Czechoslovakia

[73] Assignee: Vyskumny ustav mechanizacie a automatizacie, Vahom, Czechoslovakia

[22] Filed: Oct. 29, 1971

[21] Appl. No.: 193,848

[52] U.S. Cl. ........ 204/129.25, 204/224 M, 204/225, 204/277
[51] Int. Cl. ........................... B23p 1/00, B23p 1/02
[58] Field of Search ..................... 204/129.7, 129.2, 204/129.25, 129.55, 224 M, 277

[56] References Cited
UNITED STATES PATENTS
| | | | |
|---|---|---|---|
| 3,650,922 | 3/1972 | Augustin et al. | 204/224 X |
| 3,673,072 | 6/1972 | Fleury et al. | 204/224 M |

FOREIGN PATENTS OR APPLICATIONS
| | | | |
|---|---|---|---|
| 12848 | 7/1966 | Japan | 204/129.25 |

*Primary Examiner*—John H. Mack
*Assistant Examiner*—D. R. Valentine
*Attorney*—Richard Low et al.

[57] ABSTRACT

The controlled passage of an unstable mixture of a working medium through the working gap in electric working processes and which passage is controlled by dependence on the relative position of tool and workpiece according to a predetermined program in order to change the conductivity of the working medium and apparatus for carrying out the same.

2 Claims, 4 Drawing Figures

3,773,636

METHOD FOR THE CONTROL OF THE PASSAGE OF THE WORKING MEDIUM FOR ELECTRIC WORKING PROCESSES AND ARRANGEMENT FOR EXECUTING THIS METHOD

BACKGROUND OF THE INVENTION

This invention relates to a method for the control of the passage of the working medium in electric working processes and to an apparatus for carrying out this method.

A number of parameters, substantially influence the technology of the course of different, known electric working methods. However, proper attention has not been paid to some of these parameters. One of these parameters is the rate of passage of the liquid working medium which acts either as a dialectric as, for example, in electrospark working or as an electrolyte as for example, in electrochemical working. The through-flowing dielectric safeguards the stability of the process in electro-spark working. However, as the shape and magnitude of the interelectrode space change in the course of working, the rate of passage of the electrolyte changes from place to place with a simultaneous change of its electric strength. The consequences thereof are different working conditions which results in a different rate of removal of material from the work-piece and reduction of the electrode, causing, finally, un uneven surface on the workpiece.

The rate of passage of the liquid working medium in electrochemical working with a pure electrolyte influences the magnitude of the anodic diffusion layer and this enables a high current density which is one of the most important conditions for electrochemical working. In electrochemical working with an unstable mixture of electrolyte and gas where the specific electric conductivity of the medium in the interelectrode space changes and depends on the shape of the tool and on its depth of penetration into the workpiece, the control of the passage of the electrolyte during the course of working is an essential part of the technological process, in order to achieve an accurate surface on the workpiece. For repeated penetration it is important that for each individual penetration of the same depth, an exactly predetermined amount of working liquid should pass through the working gap.

SUMMARY OF THE INVENTION

It is an object of this invention to provide control of the passage of a working medium through the working gap in electric working processes and which allows change of the electric conductivity of the working medium depending upon the position of the tool.

It is another object of this invention to provide control of the passage of an unstable working medium having a variable electrical conductivity in electrochemical working where, between the tool and the workpiece a small interelectrode space is maintained and through which space the working medium flows, cooperating in the removal of the material of the workpiece in connection with an applied voltage.

According to this invention, a change in the position of the supply valve which supplies liquid working medium is caused by the relative position of the tool with respect to the workpiece through a templet, whereby the operating surfaces of the templet determine that a programmed amount of liquid working medium flow through the interelectrode space.

A suitable arrangement for carrying out the method of this invention comprises a frame including a guide, a sliding block guided in a vertical direction by the guide, the sliding block being provided with a mixer to which the working tool is fixed. A templet fixed to the sliding block cooperates with a follower pin connected to a valve piston which is horizontally slidably arranged in a body fixed to the frame. A supply chamber is provided in the body above the piston, the supply chamber having a supply port and a discharge port and the piston being provided with two channels controlling the passage of the liquid to the mixer and to the discharge chamber and conduit, respectively.

An advantage of this invention is, that for a complicated working electrode shape, where it is necessary to work with a surplus of liquid electrolyte completely covers or fills the electrode gap, no manual control of the amount of liquid is required. Another advantage is that in the first working phase it is possible to operate with a larger gap than used for the finishing phase, ss that the safety of the working up to the final working phase can be increased (for instance by using gaps from 0.2 mm up to 0.04 mm). Another advantage of this invention also is that in the final working phase a relatively small front gap can be maintained, so that lateral gaps are small and a relatively high accuracy of dimensions of hollowed spave is achieved without any substantial correction of the tool or of the working electrode. This result is achieved by a programmed variation of the amount of the liquid electrolyte with respect to the amount of gas (of air). Thus a working mixture is created, the electrical conductivity of which depends on the ratio of these components.

THE DRAWINGS

An examplary embodiment for executing the method according to this invention is shown in the accompanying drawings wherein.

DESCRIPTION OF PREFERRED EMBODIMENT

Figure 1:
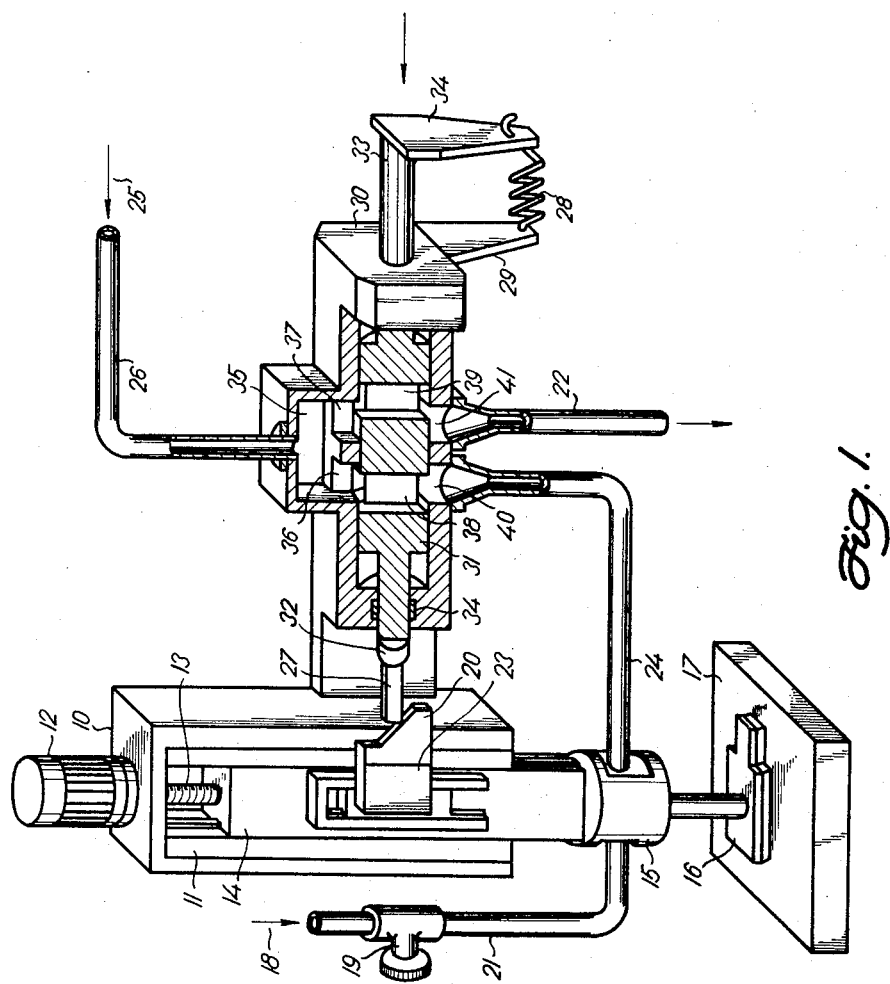
FIG. 1 is an overall view on an arrangement for electrochemical working using an unstable mixture of electrolyte and gas with parts of the arrangement in section.

Referring now to FIG. 1, the arrangement comprises a frame 10 having a vertical guide 11, guiding a sliding block 14. The sliding block 14 is connected at its top through a motion screw 13 with an electric motor 12, thereby controlling the position of the sliding block 14 with respect to the frame 10. A mixer 15 serving to mix the liquid working medium 25 and a gas 18 is fixed to the lower part of the sliding block 14. A working tool 16 is connected to the mixer 15. A templet 20 is fixed by means of a bracket 23 to the sliding block 14, the shape of the active surface of said templet determining the programmed amount of liquid working medium flowing through the interelectrode gap. A follower pin 27 connected to a control arm 32 of a piston 31 engages the templet 20. The piston 31 is supported horizontally slidably in the valve body 30, fixed to the frame 10. A supply chamber 35 for liquid working medium is provided in the valve body 30 above the piston 31, the supply chamber 35 having a supply port 36 and a discharge port 37. The supply port 36 terminates opposite to the outlet chamber 40 in the valve body 30 and the discharge port 37 opposite to the discharge chamber 41. The piston 31 is connected on one side to control arm 32, at the other side to another control arm 33 passing through the valve body 30. This second control arm 33 is provided at its extremity with a bracket 34, to which one end of a spring 28 is fixed, the other end of which is fixed to a bracket 29 connected to the valve body 30. The piston 31 has a channel 38 perpendicular to its axis serving for interconnecting the supply port 36 with the outlet chamber 40. Another corresponding channel 39 interconnects the discharge port 37 with the discharge chamber 41. A conduit 24 connects the outlet chamber 40 with the mixer 15, with another conduit 21 having a valve 19 terminating euqally in the mixer 15. The discharge chamber 41 is connected by means of the conduit 22 with a drain (not shown). A supply conduit 26 for the supply of the liquid working medium 25 terminates in the supply chamber 35.

Figure 2:
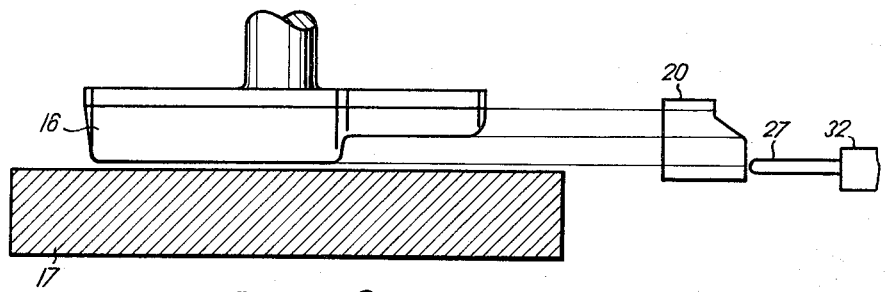
FIG. 2 is a diagrammatic view showing the starting position of the tool and workpiece where a maximum amount of liquid working medium is flowing through the working gap.
Figure 3:
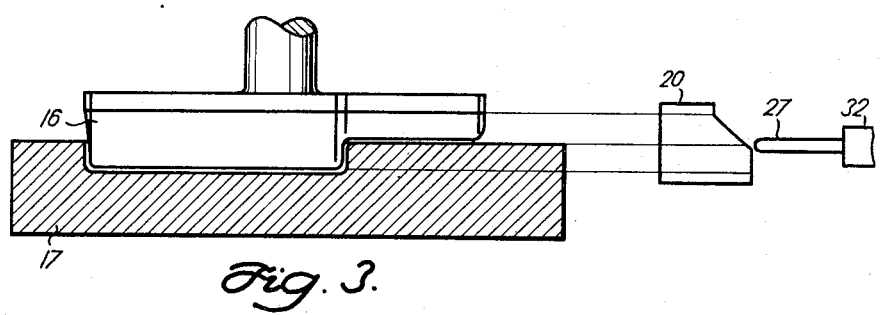
FIG. 3 is a similar view showing a change of the flow of the liquid working medium is made.
Figure 4:
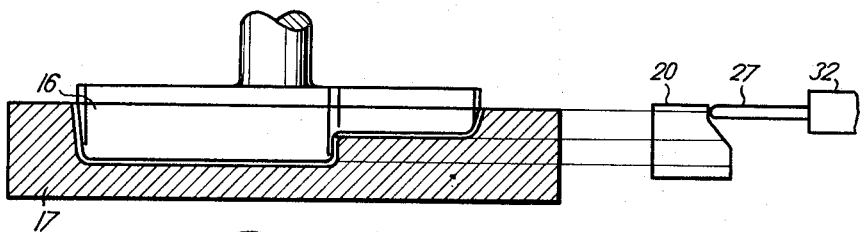
FIG. 4 is a similar view showing the tool and workpiece in the course of the final working phase.

In the course of electrochemical working with application of control according to this invention, an interelectrode space for the passage of the liquid working medium is established prior to start of the working. The device operates as follows, the description of the operation beginning at the moment, where the working tool 16 is above the workpiece in the starting position (FIG. 2). At this moment the follower pin 27 contacts the starting point of the templet 20, being forced against the templet 20 by pressure of the spring 28. In this starting position the piston 31 in the valve body 30 is in a position where the channel 38 connects the supply port 36 with the outlet chamber 40 and the channel 39 passes practically no liquid from the discharge port 37 to the discharge chamber 41. When starting the electrochemical working, gas, such as air, 18 starts to flow via the conduit 21 to the mixer 15 and liquid working medium 25 passes to the supply chamber 35 and through the channel 38 to the conduit 24. By starting the electric motor 12, the sliding block 14 with the working tool 16 start to move downwards, introducing the proper electrochemical working of the workpiece 17. The position of the working tool 16 is transmitted in the course of its movement to the templet 20, moving together with the working tool 16. The follower pin 27 follows in the course of this movement the shape of the templet 20, allowing the piston 31 to be shifted to the left. This movement of the piston 31 causes a partial overlapping of the supply port 36 and an opening of the discharge port 37. The working tool 16 starts to penetrate into the workpiece 17, whereby supply of liquid working medium 25 into the interelectrode space is gradually decreased. The excess working liquid 25 passes from the supply chamber 35 via the discharge port 37, the channel 39, the discharge chamber 41 and the conduit 22 to the sink. In the course of the penetrating of the working tool 16 into the workpiece 17, the position of the templet 20 and consequently also of the piston 31 is changed so that for instance in the position indicated in FIG. 3 the follower pin 27 is in the central part 22 of the templet 20, where the depth of penetration of the working tool 16 into the workpiece 17 amount to one half the thickness thereof. At the moment the operation is finished, as indicated in FIG. 4, the follower pin 27 contacts the end part of the templet 20, whereby the piston 31 is in a position, where the supply port 36 and the outlet chamber 40 are nearly closed, so that only a small part of the liquid working medium 25 enters the interelectrode space. The excess liquid working medium flows over the channel 39 and the conduit 22 to the sink. After finishing the operation, the sliding block 14 with the working tool 16 are removed from the workpiece 17, carrying along also the templet 20 so that the follower pin 27 contacts the starting position on the templats again and the piston 31 is in a position where the liquid working medium 25 can flow along the described track into the mixer 15 and the apparatus is prepared for the next operation.

What is claimed is:

1. A method for controlling a valve means for the passage of a working medium in electrical working processes, such as electrochemical working processes, comprising introducing a mixed working medium into an interelectrode space between the tool and the worked surface of the workpiece, while an electric voltage which is applied between said tool and said workpiece, cooperates with the working medium to remove material from the workpiece, changing the relative position of said tool with respect to said workpiece as the penetration of the tool into the workpiece progresses and controlling said valve means and effecting control of the supply of a liquid component of said working medium, and allowing a programmed amount of liquid working medium to enter the interelectrode space as the penetration progresses.

2. An apparatus for the control of valve means for the passage of a liquid component of a working medium for electrical working processes, such as electro-chemical working processes, employing a mixed working medium comprising a frame, a vertical guide in said frame, a sliding block guided in said guide, mixing means for mixing said working medium connected to said sliding block, a working tool fixed to said mixing means, means for imparting a vertical movement to the sliding block connected to said mixing means and said working tool to move said tool towards a workpiece, a templet fixed to said sliding block, a valve body fixed to the frame, a spring loaded piston disposed in said valve body for horizontally slidable movement therein, said piston extending into a follower pin engaging said templplate, a chamber to supply liquid working medium at the top of said valve body, conduit means connecting the lower part of the valve body with said mixer, conduit means connecting the valve body with discharge means, channel means in the valve body and in the piston dependent on the position of the piston to allow passage of a specific amount of liquid working medium to the mixer and to the discharge.

* * * * *